(12) United States Patent
Heaf

(10) Patent No.: US 6,286,313 B1
(45) Date of Patent: Sep. 11, 2001

(54) INTEGRATED COGENERATION SYSTEM AND BEVERAGE MANUFACTURE SYSTEM

(75) Inventor: Nicholas John Heaf, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/511,566

(22) Filed: Feb. 23, 2000

Related U.S. Application Data

(62) Division of application No. 08/966,394, filed on Nov. 7, 1997, now Pat. No. 6,047,547.

(51) Int. Cl.[7] .......................................... F02G 3/00
(52) U.S. Cl. ................................. 60/616; 60/618
(58) Field of Search .............................. 60/614, 616, 618

(56) References Cited

U.S. PATENT DOCUMENTS

| | | | |
|---|---|---|---|
| 3,350,876 | 11/1967 | Johnson | 60/618 |
| 4,120,157 | * 10/1978 | Tang | 60/618 |
| 4,182,127 | * 1/1980 | Johnson | 60/618 |
| 4,302,297 | 11/1981 | Humiston | 202/185 |
| 4,420,942 | 12/1983 | Davis et al. | 60/618 X |
| 4,668,341 | 5/1987 | Nilsson | 162/23 |
| 4,699,642 | 10/1987 | Perry et al. | 62/541 |
| 4,899,544 | 2/1990 | Boyd | 60/618 |
| 4,942,734 | 7/1990 | Markbreiter et al. | 60/39.02 |
| 4,977,745 | 12/1990 | Heichberger | 62/10 |
| 4,995,234 | 2/1991 | Kooy et al. | 60/648 |
| 5,001,902 | 3/1991 | Garbo | 60/648 |
| 5,133,190 | 7/1992 | Abdelmalek | 60/648 |
| 5,233,837 | 8/1993 | Callahan | 62/38 |
| 5,321,946 | 6/1994 | Abdelmalek | 60/648 |
| 5,339,633 | 8/1994 | Fujii et al. | 60/648 |
| 5,346,592 | 9/1994 | Madani | 202/176 |
| 5,405,503 | 4/1995 | Simpson et al. | 203/10 |
| 5,485,728 | 1/1996 | Dickinson | 60/648 |
| 5,622,605 | 4/1997 | Simpson et al. | 203/10 |
| 6,047,547 | * 4/2000 | Heaf | 60/618 |

FOREIGN PATENT DOCUMENTS

| | | |
|---|---|---|
| 2 452 196 | 10/1980 | (FR) . |
| WO 94/29576 | 12/1994 | (WO) . |

* cited by examiner

*Primary Examiner*—Hoang Nguyen
(74) *Attorney, Agent, or Firm*—Sutherland, Asbill & Brennan, LLP

(57) ABSTRACT

An integrated cogeneration system comprising a combustion engine electric power generator, a combustion powered water boiler, a carbon dioxide recovery unit for receiving exhaust from the combustion engine electric power generator and water boiler and recovering carbon dioxide from the exhaust, and a compressor for receiving recovered carbon dioxide from the carbon dioxide recovery unit and liquefying the recovered carbon dioxide. The cogeneration system can also include a heating or cooling system powered by the combustion engine electric power generator. The integrated cogeneration system is desirably modular for transportation in discrete modules and assembly at a remote location. The integrated cogeneration system is useful in supporting manufacture of beverages in sealed containers.

21 Claims, 2 Drawing Sheets

INTEGRATED COGENERATION SYSTEM AND BEVERAGE MANUFACTURE SYSTEM

CROSS-REFERENCE TO RELATED APPLICATIONS

This application is a divisional of U.S. application Ser. No. 08/966,394 filed on Nov. 7, 1997 now U.S. Pat. No. 6,047,547.

TECHNICAL FIELD

This invention relates to cogeneration of electric power, heat in the form of steam or hot water, cooling, carbon dioxide, and other products. More particularly, this invention relates to cogeneration of such products for use in the production of beverages.

BACKGROUND OF THE INVENTION

Beverage manufacturing plants, including carbonated filling plants for producing carbonated beverages, consume large quantities of carbon dioxide, electric power, water, heat, and other resources, in the operation of the plant and in the production of such beverages. Carbon dioxide, normally liquid carbon dioxide, is used to carbonate the beverages. Large quantities of carbon dioxide are required in a carbonated beverage producing plant. Electric power is used to power many processes involved in filling beverages including powering electric motors and providing cooling and heating. Heat in the form of steam or hot water, or both. is used in carbonated beverage production for processes such as dissolving sweetener and washing bottles. Clean water forms part of the carbonated beverage itself. Beverages are also cooled by cold water during the manufacturing process.

In industrially developed countries, the above-described products for supporting a carbonated beverage filling plant can often be secured from outside sources and in sufficient quantities to meet carbonated beverage production requirements. However, large quantities of carbon dioxide are still needed and existing systems and sources of the forms of energy are costly and often produced by inefficient systems. In developing nations and even in remote areas of industrially developed countries, the above-described products necessary to support a carbonated beverage filling plant are not readily available from reliable sources or at suitable prices. Reliable sources of electric power and liquid carbon dioxide are particularly difficult to find in many developing countries and remote regions of developed nations. Further, various equipment and energy for producing electric power, liquid carbon dioxide, heat, cooling, and other products for use in a beverage filling plant are not readily available in developing countries.

Moreover, traditional beverage production and filling plants take large amounts of materials to build the manufacturing systems. Accordingly, in developing countries, other remote areas, and even in industrial nations, there is a need to produce electric power, liquid carbon dioxide, and other energy and products necessary for filling carbonated and non-carbonated beverages of various types at the site of the bottling plant. Therefore, there is a need for an energy efficient system for on-site production of energy and other products used in a carbonated beverage filling system. There also exists a need for a cogeneration system for a beverage manufacturing plant which can be built in a variety of locations. In addition, there is a need for beverage manufacturing plants which can be more quickly and inexpensively constructed and brought into production.

SUMMARY OF THE INVENTION

This invention satisfies the above-described needs by providing an integrated cogeneration system which produces the necessary energy including electric power, hot water, steam and cold water, liquid carbon dioxide and other products necessary for producing and filling beverages at the site of the beverage production facility. The invention provides a system for producing such energy and products at the site of the filling operation. The integrated cogeneration system of this invention can be easily transported to and installed at virtually any location. Due in part to its integral design, the integrated cogeneration system of this invention is efficient and saves costs when incorporated into a beverage production facility.

More particularly, the invention provides an integrated cogeneration system comprising a combustion engine electric power generator, a combustion powered water boiler, a carbon dioxide recovery unit connected with the combustion engine electric power generator and water boiler so as to receive exhaust gases from the combustion engine electric power generator and the water boiler for recovering carbon dioxide from the exhaust gases, and a compressor for receiving recovered carbon dioxide from the carbon dioxide recovery unit and liquefying the recovered carbon dioxide. This invention also encompasses a portable integrated cogeneration system and a method for providing cogeneration at a remote location. According to another aspect of the present invention. a carbonated beverage filling system including the above-described cogeneration system is provided. It should be understood, however, that the cogeneration system of this invention is also useful to supply non-carbonated beverage production and systems which produce both carbonated and non-carbonated beverages.

The cogeneration system of this invention produces relatively large quantities of carbon dioxide, which is desirable in producing carbonated beverages. The cogeneration system produces these large quantities of carbon dioxide by recovering carbon dioxide from one and preferably both a combustion engine electric power generator and a combustion powered water boiler. The carbon dioxide recovery unit uses electric power and heat from one or preferably both the combustion engine electric power generator and the water boiler in the recovery of carbon dioxide. Furthermore, when the cogeneration system is located on a beverage production plant site, the cogeneration system provides, in addition to carbon dioxide, electric power and heat for powering systems and providing heat to the beverage production. The heat, in the form of steam, hot water, or both, is particularly useful in dissolving sweetener during beverage production.

Desirably, the integrated cogeneration system of this invention further comprises a steam powered electric power generator powered by steam produced by the boiler to provide yet additional electric power for use by various components of the cogeneration system and the beverage filling facility.

More particularly the cogeneration system of the present invention includes a cooling system powered by the combustion engine electric power Generator. This cooling system provides a relatively energy balanced and efficient cogeneration system. The relatively balanced and efficient cogeneration system includes the cooling system that utilizes excess energy produced by the combustion engine electric power generator and the combustion powered water boiler so that the combustion engine electric power generator and combustion powered water boiler can operate at high and efficient levels even when demand for energy by the beverage filling facility and other components of the cogeneration system are low or erratic. The cogeneration system can preferably run with the combustion engine electric power generator and combustion powered water boiler at levels approaching optimum levels. The cooling system, particularly as utilized in a beverage filling plant, consumes large quantities of energy. The cooling system stores excess energy produced by the cogeneration system in the form of cooled liquid such as water or glycol and, when the cooling system includes a heat pump, the excess energy can be stored in the form of heated liquid, such as hot water or steam. The cogeneration system thus provides cooling in the form of chilled water which is utilized in producing carbonated beverages in large quantities to cool the beverage during processing. The chilled water is particularly useful to cool the beverage in a beverage production process after the beverage has been heated to dissolve the sweetener but prior to carbonating and filling the beverage.

Still more particularly, the cooling system of this invention is adapted to provide cooling to various components of the cogeneration system, such as the carbon dioxide compressor and various components of the beverage filling facility, such as air conditioning for the filling facility building. In addition, the combustion engine electric power generator, and optionally, the steam powered turbine electric power generator, can be adapted to power various components of the cogeneration system such as the carbon dioxide compressor and various components of the bottling facility.

According to an embodiment of this invention, the cogeneration system includes waste water treatment system for converting waste water into clean water useful in the production of bottled carbonated beverages. The cooling system of the cogeneration system can be adapted to provide the cooling necessary to operate a waste water treatment method.

Yet more particularly, the integrated cogeneration system of this invention further encompasses a nitrogen recovery system which can be adapted to receive exhaust gases from the carbon dioxide recovery system after the carbon dioxide has been stripped from the exhaust. This nitrogen is particularly useful in the production of non-carbonated beverages in filing the head space in the package. Such non carbonated beverages can be produced in a beverage production facility utilizing the cogeneration system according to the present invention.

As mentioned above, this invention also encompasses a portable integrated cogeneration system. This portable system can comprise a modular cogeneration system assembly wherein the combustion engine electric power generator, the combustion powered water boiler, the carbon dioxide recovery unit, and the compressor are adapted for transportation in a plurality of discrete modules and assembly after transportation into the integrated cogeneration system. This assembly is transported in the plurality of discrete modules from a first location, where such components are available, to a second location, such as a developing nation, remote from the first location and then assembled at the remote location.

Such a cogeneration system can be sited, tested and fitted to be easily assembled and ready for operation at the secured site and can be utilized in any site. Such a cogeneration system can also be disassembled and transported to yet a third location and reassembled, and then a further location and so on. According to a particular embodiment, the combustion engine electric power generator is transported in a first of said plurality of discrete modules, the combustion powered water boiler is transported in a second of the plurality of discrete modules, and the carbon dioxide recovery unit and the compressor are transported in a third of said plurality of discrete modules. The components of the cogeneration assembly can be transported in a variety of modular arrangements. It is particularly desirable that the modules be transportable in standard size shipping containers. This modular, transportable cogeneration system is economical to transport to and use in any location including remote areas and saves costs in beverage production when compared to the use of traditional sources of supply for supporting beverage production.

Therefore, an object of the present invention is to provide an improved beverage production system including an improved carbonated beverage production system.

Another object of the present invention is to provide an improved cogeneration system.

Still another object of the present invention is to provide an efficient system for cogeneration of products including electric power, heat in the form of steam or hot water, cooling including in the form of cold water and carbon dioxide.

Yet another object of the present invention is to provide an efficient cogeneration system to provide energy and products to support a carbonated beverage filling facility.

A further object of the present invention is to provide an efficient and relatively balanced cogeneration system for use in any location including developing nations and other remote areas to support carbonated beverage filling facilities.

Other objects, features, and advantages of this invention will become apparent from the following detailed description of embodiments, drawings, and claims.

DETAILED DESCRIPTION OF DRAWINGS

As summarized above, this invention encompasses an integrated cogeneration system, a method for providing cogeneration at a beverage production location, and use of such a cogeneration system in a beverage production system. A beverage production system made in accordance with an embodiment of the present invention. including an integrated cogeneration system, is described in detail below.

Figure 1:
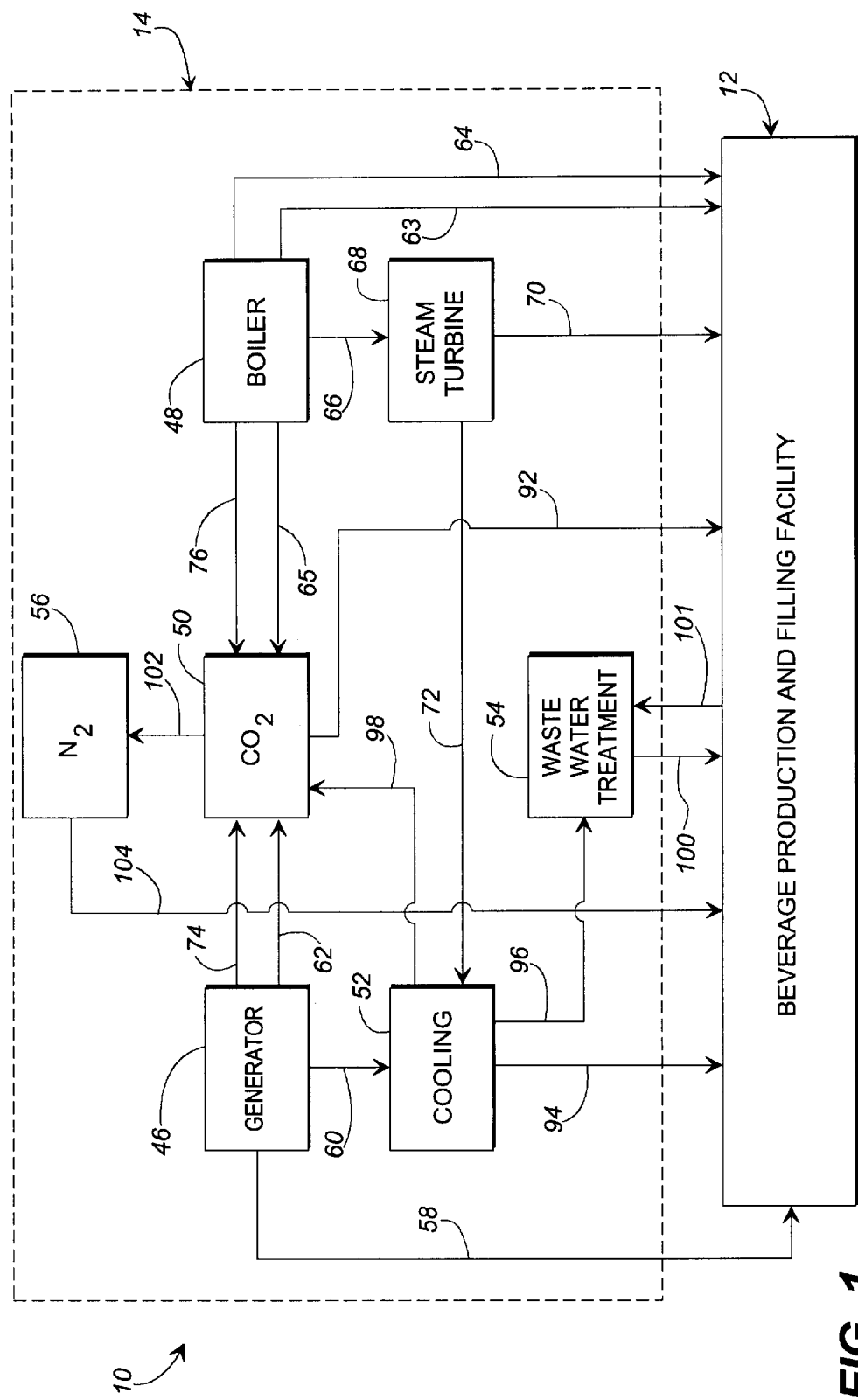
FIG. 1 is a schematic diagram of a beverage producing system including an integrated cogeneration system made in accordance with an embodiment of the present invention.

Turning to FIG. 1, a beverage production system 10, made in accordance with an embodiment of the present invention is illustrated and includes a carbonated beverage production and filling facility 12 (hereinafter the beverage filling facility) directly supported by an adjacent cogeneration system 14. The cogeneration system 14 provides various products used by the filling to facility 12.

Figure 2:
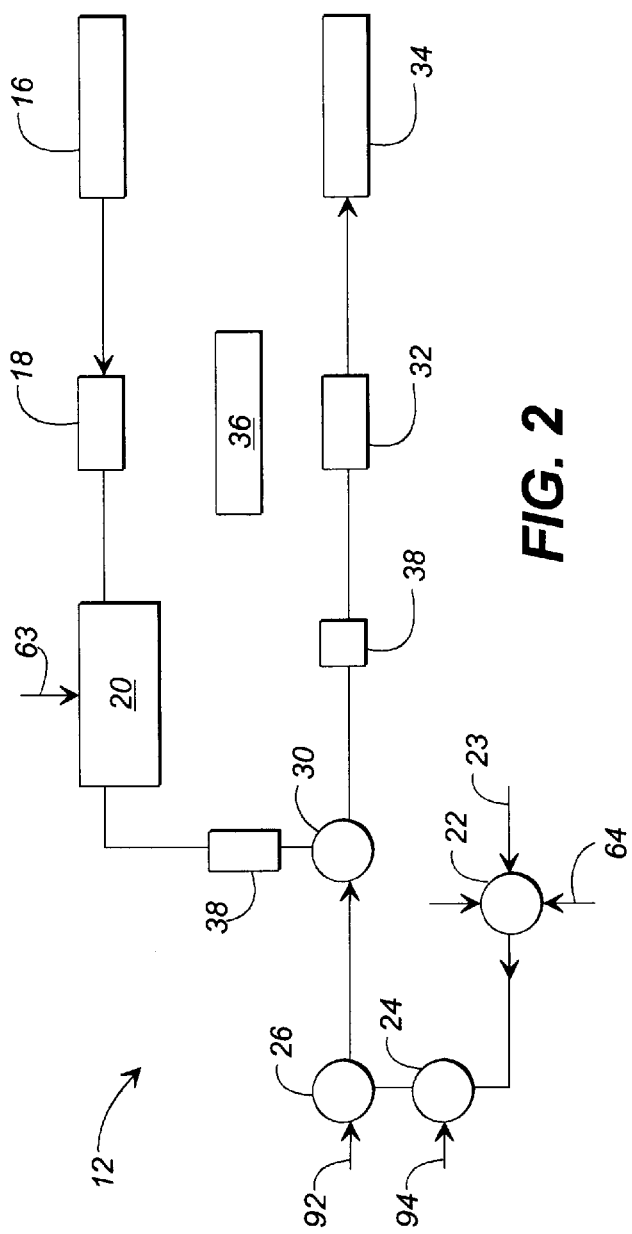
FIG. 2 schematic diagram of a beverage production and filling facility which forms part of the system illustrated in FIG. 1.

Carbonated beverage filling facilities and other types of beverage production facilities are well known. The components of the carbonated beverage filling facility 12 are illustrated in FIG. 2. The beverage filling facility 12 is a typical beverage filling facility for producing carbonated beverages. It should be understood, however, that although the filling facility 12 is shown as a carbonated beverage filling facility, the cogeneration system 14 can be used to supply non-carbonated beverage filling facilities and facilities which produce both carbonated and non-carbonated beverages. For example, the cogeneration system 14 can be used to supply facilities for producing soft drinks, coffee, tea, fruit and vegetable juice concentrates and/or beverages, isotonic beverages and non isotonic beverages.

The filling facility 12 illustrated in FIG. 2 is particularly suited for filling bottles such as glass or PET bottles with carbonated beverages, but other beverage containers which can be used include cans made from aluminum, steel, or other suitable metal, pouches, paper cartons and packaging, bag-in-box containers, aseptic and near aseptic packages, drums, canisters, totes, tankers, and other beverage containers and packaging.

Generally described, the filling facility 12 includes a bottle depalletizer 16 and a bottle uncaser 18 for unloading bottles for filling, a bottle washer 20 for cleaning bottles with hot water, a beverage mixing station 22 for mixing flavored concentrate, water, and sweetener fed through line 23 and heating the beverage to dissolve the sweetener, a beverage cooler 24 for cooling the heated beverage, a carbonation unit 26 for carbonating the cooled beverage, a bottle filler and capper 30 for filling and sealing the beverage within the bottles, and a drop packer 32 and a palletizer 34 for packing the filled and sealed bottles. The filling facility 12 also includes a case washer 36 for washing the bottle cases before the cases are reloaded with filled and sealed bottles and a number of inspection stations 38 for ensuring quality control. These functional units are housed in a building (not shown) which is desirably heated and air conditioned. As is explained below, the cogeneration system 14 provides electric power to run the various components of the filling facility, hot water to wash the bottles and cases, steam to heat the beverage mixture and dissolve the sweetener, and cold water to cool the heated beverage prior to carbonation. The cogeneration system 14 also provides heating and cooling for the filling facility building.

The cogeneration system 14 is an integrated, modular system, which can be transported in standard size shipping containers and assembled after transportation into the cogeneration system. The components of the cogeneration system 14 can thus be manufactured, tested or collected at one location, adapted for transportation in a plurality of discrete modules, and then assembled after transportation to a second location remote from a first location without requiring substantial or lengthy testing of the system or construction. For example, components of the cogeneration system 14 can be manufactured or collected in one location, transported in discrete modules to a second location, and assembled at the remote location into a functioning cogeneration system coupled with the beverage production and filling facility. Furthermore, the cogeneration system 14 can be subsequently disassembled at the second location and transported to and reassembled at a third location. This disassembly and reassembly process can be continued as needed. For example, the cogeneration system 14 can be moved from one filling facility to another or between filling facilities in very different parts of the world to take advantage of different seasons in different parts of the world.

Because the cogeneration system 14 is integral and modular, the cogeneration system can be easily transported to and installed at a beverage production facility 12 at virtually any location and is efficient and saves costs when incorporated into a beverage production facility.

Generally described, the cogeneration system 14 includes a combustion engine electric power generation module 46, a water boiler module 48, a carbon dioxide recovery and storage module 50, a cooling module 52, a waste water treatment module 54, and a nitrogen recovery module 56. It should be understood, however, that the components of the cogeneration system 14 can be arranged in various modular configurations. The modularity of the cogeneration system 14 is designed to enable transportation of the components to a remote site and assembly of the cogeneration system at the remote site. Desirably, the modules are arranged and sized so that the modules can be transported in standard size shipping containers and assembled with minimum set-up or construction. For example, each of the components can be positioned on a concrete slab.

The cogeneration system 14 coproduces electric power heat in the form of steam or hot water, carbon dioxide, cooling, including cold water and cooled air, clean water from waste water, and, optionally, nitrogen. All such products are useful in a carbonated beverage bottling facility. Such a cogeneration system is particularly useful in underdeveloped countries which do not have a reliable electric power system or sufficient supplies of liquid carbon dioxide.

The combustion engine electric power generation module 46 of the cogeneration system 14 includes one or more combustion engine electric power generators which serve as the primary source of electric power for the beverage production facility 12. Diesel powered generators are desirable, but other combustion engine generators powered by fuels such as fuel oil, gasoline, natural gas, and other fossil fuels are suitable. Electric power produced by the combustion engine generator module 46 supplies electric power directly to the beverage production facility 12 through line 58 to run the functional units within the filling facility as described above and to the heating and air conditioning systems of the filling facility. In addition, the combustion engine generator module 46 supplies other modules in the cogeneration system 14 with electric power as needed. The combustion engine generator module 46 supplies electric power to the cooling modules through line 60, the carbon dioxide recovery and storage module through line 62, and any other process or device in the filling system 10 needing electric power. If adequately sized, the combustion engine generator module 46 can operate the carbonated beverage production system 10 without external power such as from local utilities, and in some circumstances can supply excess power to the local commercial utility grid.

The water boiler module 48 includes a combustion powered water boiler for providing hot water or steam or both, through lines 63 and 64, respectively, to the beverage production facility 12 and other cogeneration system modules as needed. For example, the boiler module 48 feeds hot water through line 63 to the bottle washer 20 and the case washer 36, steam through line 64 to the mixing and heating unit 22, and hot water, or steam or both to the carbon dioxide recovery module 50 through line 65. The boiler can be fired by a variety of fossil fuels including fuel oil, natural gas, kerosene, diesel fuel, coal, and the like.

The boiler module 48 also provides steam through line 66 to a steam powered turbine electric power generator 68 for supplying additional electric power to the beverage production facility 12 through line 70 and the cooling module 52 through line 72, or other components of the carbonated beverage bottling system 10 as needed.

Figure 3:
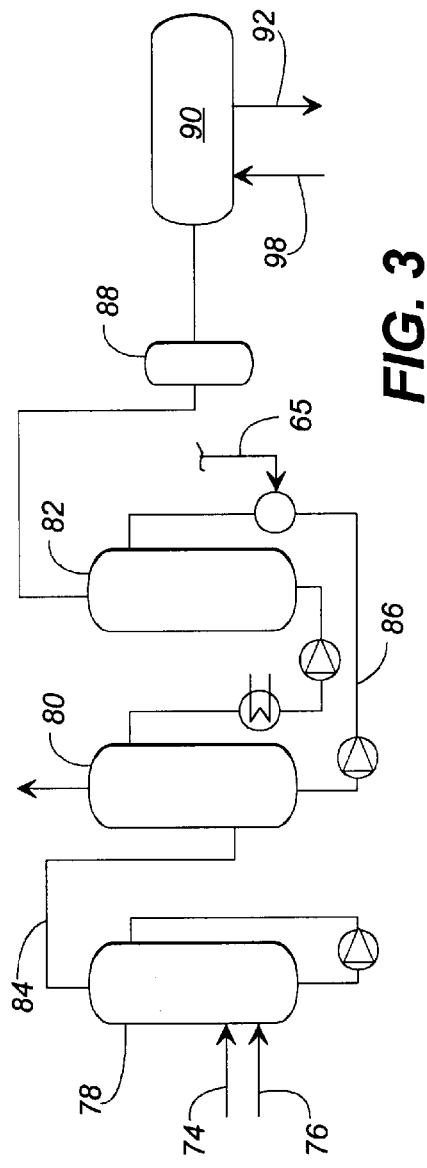
FIG. 3 schematic diagram of a carbon dioxide recovery unit which forms part of the system illustrated in FIG. 1.

The combustion engine electric power generation module 46 and the water boiler module 48 feed carbon dioxide containing exhaust gases through lines 74 and 76, respectively, to the carbon dioxide recovery and storage module 50. The carbon dioxide recovery and storage module 50, illustrated in FIG. 3 includes a carbon dioxide scrubbing column 78, a carbon dioxide stripping column 80, and a condenser 82 for recovering carbon dioxide from the exhaust gases. Such carbon dioxide systems are well known to those skilled in the art. A typical recovery system is an amine solution system. The amine solution in the scrubbing column 78 absorbs carbon dioxide from the exhaust gases. The carbon dioxide-laden amine solution is then directed through line 84 to the stripping column 80 wherein the carbon dioxide is stripped with heat from the amine solution and directed through line 86 to the condenser 82. The condenser 82 removes water vapor from the recovered carbon dioxide. The dry, recovered carbon dioxide is then directed through a filter 88, such as an activated carbon filter, and then liquefied in a compressor 90 for storage. Line 92 feeds the recovered liquid carbon dioxide to the carbonation unit 26 of the filling facility 12 as needed.

The cooling module 52 desirably includes a heat pump to provide heating and cooling. It should be understood, however, that other cooling devices such as a refrigerant compressor can also be used for cooling. The heat pump or other cooling device in the cooling module 52 is powered by electric power from the combustion engine electric power generation module 46 and the steam turbine generator 68. The cooling module 52 provides cooling to the filling facility 12 and the waste water module 54 via lines 94 and 96, respectively. The cooling module 52 provides cooling to processes in the bottling facility 12, such as beverage cooling at the beverage cooling station 24, and also provides air conditioning to the building housing the bottling facility. Large quantities of cooling are required to cool the heated beverage at the cooling station 24. In the production of juice concentrates and beverages, the cooling module 52 can be used to cool the concentrates or beverages.

The heat pump in the cooling module 52 produces heat which can be used in the bottling facility 12 or other modules of the cogeneration system 14. The cooling module 52 through line 98 provides cooling of the recovered carbon dioxide as it is liquefied by the compressor 90. Compression of the carbon dioxide produces heat which is offset by cooling from the cooling module 52.

The waste water treatment module 54 desirably includes a waste water treatment system for cleaning waste water and providing clean water via line 100 to the bottling facility 12. Waste water is returned from the bottling facility 101 for treatment and purification in the waste water treatment module 54. One method is the ice method of waste water treatment which is known and also referred to as the freeze/thaw waste water treatment method. Accordingly, the ice method of waste water treatment is not described in detail herein. Generally described, however, the ice method of waste water treatment includes freezing waste water until about 70% of the water is frozen. The remaining liquid is disposed and the ice is melted to yield highly pure water. Other known methods of waste water treatment can be utilized in the cogeneration system.

The nitrogen recovery module 56 receives from the carbon dioxide recovery and storage module 50 via line 102 exhaust gases which have been stripped of carbon dioxide. The carbon dioxide stripped exhaust gases include mostly nitrogen and nitrous oxide which can be recovered and used, for example, to fill the head space in non-carbonated bottled beverages. The nitrogen recovery module 56 is useful in conjunction with the filling facilities which produce carbonated and non-carbonated bottled beverages. In FIG. 1, line 104 feeds nitrogen from the nitrogen recovery module to the bottling facility.

Although the heat pump in the cooling module 52 is desirably powered with electricity provided by the combustion engine generator module 46 and the steam turbine generator 68, it is also possible to power the heat pump by direct mechanical linkage between the combustion engine generator in the combustion engine generator module. To do so, the drive shaft from the combustion engine generator is coupled directly to the drive shaft of the heat pump.

The cogeneration system 14 is energy efficient because it recovers carbon dioxide from both a combustion engine electric power generator 46 and a combustion powered water boiler 48 and, due to the large energy demand of the cooling module 52, the combustion engine generator module and the boiler can be operated at levels approaching optimum levels. The cooling module 52 uses excess energy produced by the combustion engine generator module 46 or the water boiler module 48. For example, when the bottling facility 12 demands less hot water, steam, or electric power, the combustion engine generator module 46 and the water boiler module 48 can continue to operate at near optimum levels while supplying power to the cooling module 52. The integration of the different modules in the cogeneration system 14 provide a relatively energy balanced system.

Furthermore, when the cogeneration system 14 is used to supply a filling facility which alternates between production of carbonated and non-carbonated beverages, the carbon dioxide produced can be stored when non-carbonated beverages are being produced and used when carbonated beverages are being produced. This allows the carbon dioxide recovery system to operate continuously and more efficiently.

It should be understood that the foregoing relates to particular embodiments of the present invention and that numerous changes may be made therein without departing from the scope of the invention as defined by the following claims.

I claim:
1. Integrated system for producing beverages in sealed containers comprising:
    a beverage production and filling facility comprising a container washer, a beverage mixer and heater for dissolving sweetener in the beverage, a container filler and sealer for filling containers with the beverage and sealing the filled containers, and a cooler adapted to cool the beverage after the beverage has been heated; and
    a cogeneration system comprising:
        a combustion engine electric power generator which emits exhaust comprising carbon dioxide and provides electric power to the beverage production and filling facility;
        a combustion powered water boiler which emits exhaust comprising carbon dioxide and provides heat to the beverage production and filling facility including the container washer and beverage mixer and heater;
        a carbon dioxide recovery unit connected with the combustion engine electric power generator and boiler so as to receive the exhaust from the combustion engine electric power generator and the boiler for recovering carbon dioxide from the exhaust;
        a compressor adapted to receive recovered carbon dioxide from the carbon dioxide recovery unit and liquefy the recovered carbon dioxide;

a carbon dioxide delivery system adapted to deliver the recovered carbon dioxide to the beverage production and filling facility; and a cooling system powered by the combustion engine electric power generator and adapted to provide cooling to the beverage production and filling facility including the cooler.

2. Integrated system for producing beverages in sealed containers as in claim 1 wherein the combustion engine electric power generator, the combustion powered water boiler, the carbon dioxide recovery unit, and the compressor are adapted for transportation in a plurality of discrete modules and assembly after transportation into the cogeneration system.

3. Integrated system for producing beverages in sealed containers as in claim 1 wherein the beverage production find filling facility is operable without external electrical power.

4. Integrated system for producing beverages in sealed containers as in claim 1 wherein the beverage production and filling facility produces carbonated beverages.

5. Integrated system for producing beverages in sealed containers as in claim 1 wherein the beverage production and filling facility produces carbonated and non carbonated beverages.

6. Integrated system for producing beverages in sealed containers as in claim 1 wherein the cogeneration system further comprises a steam powered turbine electric power generator powered by steam produced by the boiler.

7. Integrated system for producing beverages in sealed containers as in claim 1 wherein the beverage production and filling facility further comprises a carbonation unit adapted to carbonate the beverage after the beverage has been cooled and the cogeneration system provides carbon dioxide to the carbonation unit.

8. Integrated system for producing beverages in sealed containers as in claim 6 wherein the cooling system is also powered by the steam powered turbine electric power generator.

9. Integrated system for producing beverages in sealed containers as in claim 1 wherein the combustion engine electric power generator is adapted to power the carbon dioxide compressor.

10. Integrated system for producing beverages in sealed containers as in claim 1 wherein the cooling system is adapted to cool carbon dioxide liquefied by the compressor.

11. Integrated system for producing beverages in sealed containers as in claim 1 wherein the cooling system includes an air conditioning system for cooling the carbonated beverage bottling facility.

12. Integrated system for producing beverages in sealed containers as in claim 1 wherein the cooling system comprises a heat pump and the combustion engine electric power generator is adapted to power the heat pump through a mechanical linkage operatively disposed between the combustion engine electric power generator and the heat pump.

13. Integrated system for producing beverages in sealed containers as in claim 1 wherein the cogeneration system further comprises a nitrogen recovery system for receiving the exhaust from the carbon dioxide recovery unit after carbon dioxide is stripped from the exhaust and recovering nitrogen and nitrous oxide from the exhaust.

14. Method for producing beverages in sealed containers comprising:

producing in a beverage production and filling facility beverages in sealed containers; and supplying electric power, heat, cooling and carbon dioxide to the beverage production and filling facility with a cogeneration system located adjacent the beverage production and filling facility, wherein the cogeneration system includes a combustion engine electric power generator which emits exhaust comprising carbon dioxide and supplies electric power to the beverage production and filling facility;

a combustion powered water boiler which emits exhaust comprising carbon dioxide and supplies heat to the beverage production and filling facility;

a carbon dioxide recovery unit connected with the combustion engine electric power generator and boiler so as to receive the exhaust from the combustion engine electric power generator and the boiler for recovering carbon dioxide from the exhaust;

a compressor adapted to receive recovered carbon dioxide from the carbon dioxide recovery unit and liquefy the recovered carbon dioxide;

a carbon dioxide delivery system adapted to deliver the recovered carbon dioxide to the beverage production and filling facility; and a cooling system powered by the combustion engine electric power generator.

15. Integrated system for producing beverages in sealed containers comprising:

a beverage production and filling facility; and a cogeneration system comprising:

a combustion engine electric power generator which emits exhaust comprising carbon dioxide and provides electric power to the beverage production and filling facility;

a combustion powered water boiler which emits exhaust comprising carbon dioxide and provides heat to the beverage production and filling facility;

a carbon dioxide recovery unit connected with the combustion engine electric power generator and boiler so as to receive the exhaust from the combustion engine electric power generator and the boiler for recovering carbon dioxide from the exhaust;

a compressor adapted to receive recovered carbon dioxide from the carbon dioxide recovery unit and liquefy the recovered carbon dioxide;

a carbon dioxide delivery system adapted to deliver the recovered carbon dioxide to the beverage production and filling facility; and a cooling system powered by the combustion engine electric power generator and adapted to provide cooling to the beverage production and filling facility.

16. Integrated system for producing beverages in sealed containers as in claim 15 wherein the combustion engine electric power generator, the combustion powered water boiler, the carbon dioxide recovery unit, and the compressor are adapted for transportation in a plurality of discrete modules and assembly after transportation into the cogeneration system.

17. Integrated system for producing beverages in sealed containers as in claim 15 wherein the beverage production and filling facility is operable without external electrical power.

18. Integrated system for producing beverages in sealed containers as in claim 15 wherein the beverage production and filling facility produces carbonated beverages.

19. Integrated system for producing beverages in sealed containers as in claim 15 wherein the cooling system is adapted to cool carbon dioxide liquefied by the compressor.

20. Integrated system for producing beverages in sealed containers as in claim 15 wherein the cooling system includes an air conditioning system for cooling the carbonated beverage bottling facility.

21. Integrated system for producing beverages in sealed containers as in claim 15 wherein the cooling system comprises a heat pump and the combustion engine electric power generator is adapted to power the heat pump through a mechanical linkage operatively disposed between the combustion engine electric power generator and the heat pump.

\* \* \* \* \*